US009505383B2

(12) United States Patent
Peel et al.

(10) Patent No.: US 9,505,383 B2
(45) Date of Patent: Nov. 29, 2016

(54) REMOVABLE VEHICLE OPERATION INSTRUMENT WITH REMOTE CONTROL CAPABILITY AND RELATED METHOD

(71) Applicant: Medallion Instrumentation Systems, LLC, Spring Lake, MI (US)

(72) Inventors: Ronald B. Peel, Whitehall, MI (US); Richard P. Bertalan, Norton Shores, MI (US)

(73) Assignee: Medallion Instrumentation Systems, LLC, Spring Lake, MI (US)

( * ) Notice: Subject to any disclaimer, the term of this patent is extended or adjusted under 35 U.S.C. 154(b) by 75 days.

(21) Appl. No.: 14/524,668

(22) Filed: Oct. 27, 2014

(65) Prior Publication Data

US 2015/0120089 A1 Apr. 30, 2015

Related U.S. Application Data

(60) Provisional application No. 61/896,996, filed on Oct. 29, 2013.

(51) Int. Cl.
*B60W 50/00* (2006.01)
*B60T 7/02* (2006.01)
*G05D 1/00* (2006.01)
*B60T 7/16* (2006.01)
*B62D 1/00* (2006.01)

(52) U.S. Cl.
CPC .. *B60T 7/02* (2013.01); *B60T 7/16* (2013.01); *B62D 1/00* (2013.01); *G05D 1/0038* (2013.01)

(58) Field of Classification Search
None
See application file for complete search history.

(56) References Cited

U.S. PATENT DOCUMENTS

| 8,255,093 B2 | 8/2012 | Layton et al. | |
|---|---|---|---|
| 2002/0085043 A1* | 7/2002 | Ribak | B60K 35/00 715/810 |
| 2010/0250023 A1* | 9/2010 | Gudat | E02F 9/2045 701/2 |

(Continued)

FOREIGN PATENT DOCUMENTS

WO 2006120596 11/2006

OTHER PUBLICATIONS

Wang et al., Remote controlling an autonomous car with an iPhone, Mar. 2010, Free University of Berlin, p. 1-5.*

(Continued)

*Primary Examiner* — Rami Khatib
*Assistant Examiner* — Gerrad A Foster
(74) *Attorney, Agent, or Firm* — Warner Norcross & Judd LLP

(57) ABSTRACT

A system including an instrument and a vehicle control system is provided. The instrument can include a display and a vehicle controller in communication with the vehicle control system. The instrument can be docked in a docking station of the vehicle, for example in a driver space, and used as primary instrumentation for a driver to directly control the vehicle. The instrument can be undocked and removed physically from the vehicle and used to remotely control vehicle operations from a location distant from the vehicle. A method of using the system and instrument is also provided in which a user can directly or remotely operate a vehicle with the instrument in communication with the vehicle control system. A method of using the system and/or instrument to directly or remotely operate one or more vehicles is also provided.

20 Claims, 11 Drawing Sheets

(56) References Cited

U.S. PATENT DOCUMENTS

| | | | |
|---|---|---|---|
| 2012/0242620 A1* | 9/2012 | Bos | G06F 1/169 345/175 |
| 2012/0322558 A1 | 12/2012 | Tiley et al. | |
| 2014/0062891 A1* | 3/2014 | Powell | B62D 1/046 345/173 |
| 2015/0223064 A1* | 8/2015 | Takemura | B60K 35/00 455/411 |

OTHER PUBLICATIONS

Newcomb, Why Your Next Car Should-Souldn't-Be a WiFi Hotspot, Popular Mechanics, Oct. 2012, http://www.popularmechanics.com/cars/a8161/why-your-next-car-should-and-shouldnt-be-a-wi-fi-hotspot-13852868/.*

Appirion@YouTube, iDriver—iPhone remote controlled car, Oct. 2009, YouTube, https://www.youtube.com/watch?v=oHDwKT564Kk.*

* cited by examiner

REMOVABLE VEHICLE OPERATION INSTRUMENT WITH REMOTE CONTROL CAPABILITY AND RELATED METHOD

BACKGROUND OF THE INVENTION

The present invention relates to instruments that enable a user to control a vehicle remotely or while the user is located in the vehicle.

In military and law enforcement operations, there are times when remote vehicle operation is desirable. For example, to traverse hostile or enemy territory unmanned, a vehicle may be retrofit with a custom made, retrofitted electromechanical system that is operated remotely to control certain vehicle functions, such as speed, braking and steering. An operator remote from the vehicle can utilize a remote controller that communicates with the electromechanical system to operate the vehicle. The electromechanical system, in turn, performs physical functions, such as depressing an accelerator and turning a steering wheel. In this manner, the operator can remotely drive the vehicle through the hostile territory without being at risk of physical injury if the vehicle is attacked.

While this system has functional utility with the electromechanical system installed, an operator cannot directly operate the vehicle. Thus, the retrofitted bulky and complicated electromechanical system requires disassembly, removal and modification, to return to the vehicle to a state where an operator can directly operate the vehicle by manually using vehicle controls, such as the steering wheel, brakes and accelerator. This can be troublesome, particularly where there are few vehicles dedicated to perform operations in an area. Personnel cannot be tied up installing, removing or modifying retrofit systems, particularly where time is of the essence on a battlefield or in a hostile environment.

Further, such systems are only useful when a particular territory is known to be potentially hostile. As an example, when a convoy of vehicles traverses a territory and is unexpectedly attacked, there is little time to install or initiate a remote control retrofit electromechanical system. Instead of using a cumbersome remote control retrofit system, when one vehicle in a convoy is immobilized or its occupants become injured, another vehicle in the convoy typically is driven to move the disabled vehicle or to pick up the occupants. In turn, this can result in the second vehicle becoming compromised, along with its occupants.

Thus, while remote control systems for vehicles are currently available, there remains room for improvement in their function, operation and utilization.

SUMMARY OF THE INVENTION

A system for selective direct or remote operation of a vehicle is provided, including an instrument having a display and a vehicle controller. The instrument can be docked in a docking station of the vehicle, for example, on a steering wheel, on a dashboard, in a driver space, or elsewhere, and used as the primary instrumentation for a driver to directly control or monitor the vehicle while the driver is in the driver space. The instrument can communicate with and operate an onboard vehicle control system. The instrument, however, also can be undocked and physically removed from the vehicle, and used to remotely control the vehicle from a distant location.

In one embodiment, the instrument is equipped with devices such as accelerometers and/or inclinometers, so that an operator remote from the vehicle can simulate natural driving movements and remotely steer and operate the vehicle by moving the instrument.

In another embodiment, the instrument is in the form of a panel that can be grasped by a user, similar to a steering wheel. The instrument can be configured so that a user, can rotate the panel clockwise, which results in the vehicle turning right. When the user rotates the panel counterclockwise, the vehicle will turn left. When the user tilts the panel forward, the vehicle moves forward. When the user tilts the panel rearward, the vehicle moves backward. Combinations of these movements or other movements of the panel will cause the vehicle, for example, to move forward and to the right. Generally, the instrument can translate common driving movements imparted on the instrument by the user into vehicle operation commands to control a vehicle.

In still another embodiment, the instrument can be undocked from a vehicle's driver space and held by a user located in the vehicle. The user can then operate the vehicle from a location in the vehicle other than the driver space, for example, in a cargo or personnel transport part of the vehicle. With this construction, when a primary driver is incapacitated, another vehicle occupant can simply grab the instrument and control the vehicle from another location in the vehicle without entering the driver space.

In yet another embodiment, the instrument can be docked in the driver space. One or more additional instruments can be mounted in the vehicle or carried by occupants other than the primary driver of the vehicle. The instruments can be configured to selectively operate the vehicle based on priority of the instruments.

In even another embodiment, the instrument can remotely communicate with a video camera or other imaging device on or associated with the vehicle to stream images to the display of the instrument. As an example, the images can be of terrain and other objects in front of the vehicle. With this perspective displayed on the display, the operator can visualize a similar frontal field of view that an onboard driver in the vehicle would see, and can operate the vehicle accordingly with the instrument. The operator also can attain immediate awareness of the environment within which the vehicle is located, and take appropriate action.

In still another embodiment, the instrument can be capable of communicating with a vehicle operating system, for example, an engine control module, and displaying operating conditions of the vehicle on the display. The display generally can output or show speedometer, tachometer, electrical, gear selection, braking, acceleration or other useful operating information related to the vehicle. This can enable the operator to monitor vehicle performance even while remotely operating the vehicle.

In yet another embodiment, the instrument can be capable of enabling or arming weapons systems and/or defense system of the vehicle. This enablement can be performed while the instrument is docked in a vehicle, and operating as a primary control for a driver of the vehicle to operate the vehicle, or when the instrument is removed and distant from the vehicle, operating it remotely.

In even another embodiment, multiple instruments can be used in multiple, respective vehicles. Each instrument can be used to directly or to remotely operate its primary vehicle. However, if an operator of one vehicle is required to take over operation of another, second vehicle, the instrument is capable of doing so. As an example, if the driver of a first vehicle is incapacitated, another driver of another second vehicle can use the second instrument of that second vehicle to remotely control the first vehicle with the second instrument.

In a further embodiment, where multiple instruments in multiple respective vehicles are implemented, each individual instrument can be set up to enable a user to drive and operate, and remotely control, their primary vehicle. However, an individual instrument of one vehicle also can be on a network or in communication with one, two, or more other secondary vehicles. An operator can thus use that individual instrument in a secondary capacity, to operate those other vehicles, either remotely or by removing the instrument from its primary vehicle and directly docking the instrument in a secondary vehicle.

In still a further embodiment, the instrument can communicate with a vehicle wirelessly, via Bluetooth, WiFi or RF for example. The instrument also can include a self-contained power supply, such as a battery, for portable operation. The instrument further can include a connector to connect the instrument to an additional portable power source.

The current embodiments provide a system including an instrument for direct physical control of a vehicle, as well as remote control of the vehicle. Where removable from the vehicle, the instrument can quickly enable a user to take control of the vehicle without being in a designated driver space of the vehicle. The instrument also can be used to take over and remotely control other vehicles, to assist in times of trouble or other uncontrolled circumstances. Where set up to operate a vehicle remotely using conventional vehicular driving motions, the instrument mimics those motions so a user can operate the vehicle generally instinctively, as if the user was in the vehicle, operating its controls. Where included, the display of the instrument also enables a remote user to obtain a point of view from a camera or imaging device onboard the vehicle, to operate the vehicle as if the operator was present in the vehicle and had a driver's point of view.

These and other objects, advantages, and features of the invention will be more fully understood and appreciated by reference to the description of the current embodiment and the drawings.

Before the embodiments are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

A removable, portable vehicle operation instrument and related system according to a current embodiment is illustrated in FIGS. 1-7 and generally designated 10. The instrument 10 generally is handheld and selectively portable. In other words, it can be easily picked up and held in a human's hands, operated and carried without the use of machinery or other supporting devices or structures. The instrument 10 is in communication with a vehicle control system 20. The vehicle control system can be an engine control module, a CAN BUS or onboard vehicular processor, controller or computer capable of carrying out vehicle operations or at least assisting such operations.

Figure 1:
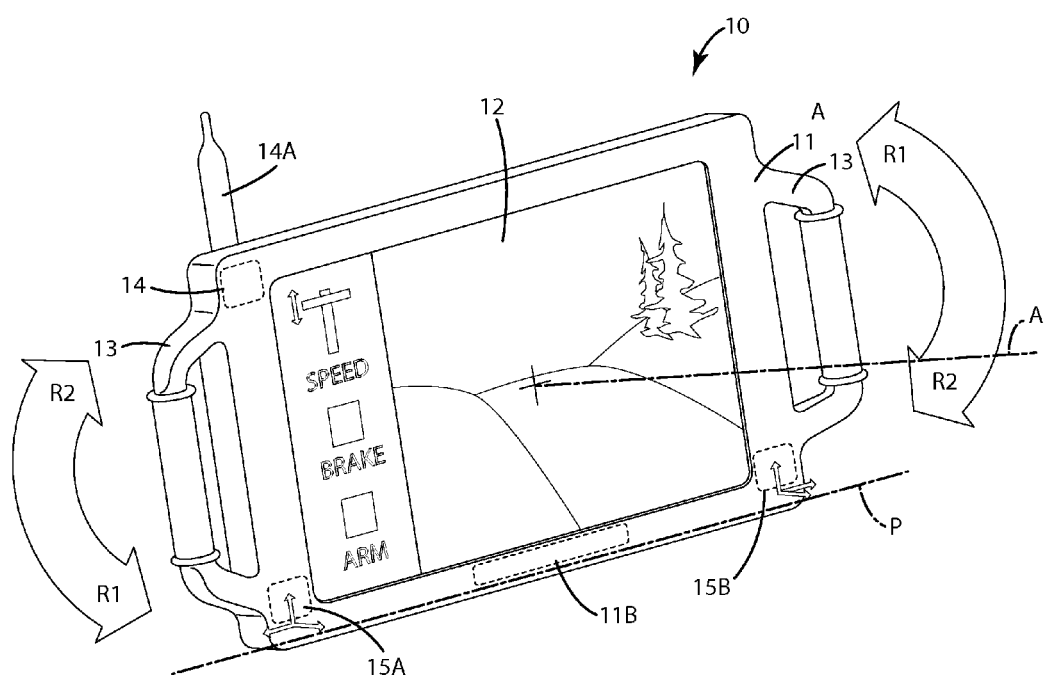
FIG. 1 is a perspective view of an instrument of a system of a current embodiment.

The instrument as shown in FIG. 1 includes a display 12. The display 12 can be a touch screen display, an LCD, a plasma screen or any other type of conventional display. The display can be mounted relative to a housing 11. The housing 11 can be constructed from a rugged polymeric, metal and/or composite material. If desired, the housing can be coated with a rubber coating to provide impact absorption and to reduce vibration. The housing 11 can include one or more handles 13 that extend laterally from the instrument 10. The handles can be used to transport the instrument 10. They also can be used to simulate portions of a steering wheel of a vehicle during operation of the instrument in a remote control mode as described below. In this manner, the user can experience a more realistic and/or familiar physical sensation while using the remote control.

The instrument 10 can include one or more sensors 15A and 15B. These sensors can be accelerometers, inclinometers, or other orientation sensing sensors. The sensors can record and/or detect relative movement of the instrument 10 by a user. Generally, the sensors 15A and 15B can detect rotation in the directions R1 and R2 about an axis A that is perpendicular to the display 12 or the instrument 10 as shown in FIG. 1. This axis A can extend orthogonal to the display. The rotation or movement can simulate steering of a steering wheel located on a vehicle with which the instrument 10 is associated. In turning the instrument clockwise in direction R2, the sensors 15A and 15B detect this motion and send a signal or command from the instrument 10 to the vehicle control system 20, which in turn can be associated with a servo or other remote electromechanical controlling system that can engage the steering column or other steering components and effect a rightward movement of the vehicle or redirection of the vehicle. When a user rotates the instrument counterclockwise in direction R1, the sensors 15A and 15B sense this rotation and send a signal or command to the vehicle control system 20, which engages a servo or other electromechanical device capable of actuating the steering system of the vehicle. Accordingly, the vehicle turns left.

Optionally, the instrument 10 can be outfitted with a transmitter and/or receiver 14 which can be coupled to an antenna 14A. The transmitter or receiver 14 can transmit and/or receive signals to or from the vehicle control system 20 for remote control operation.

Figure 2:
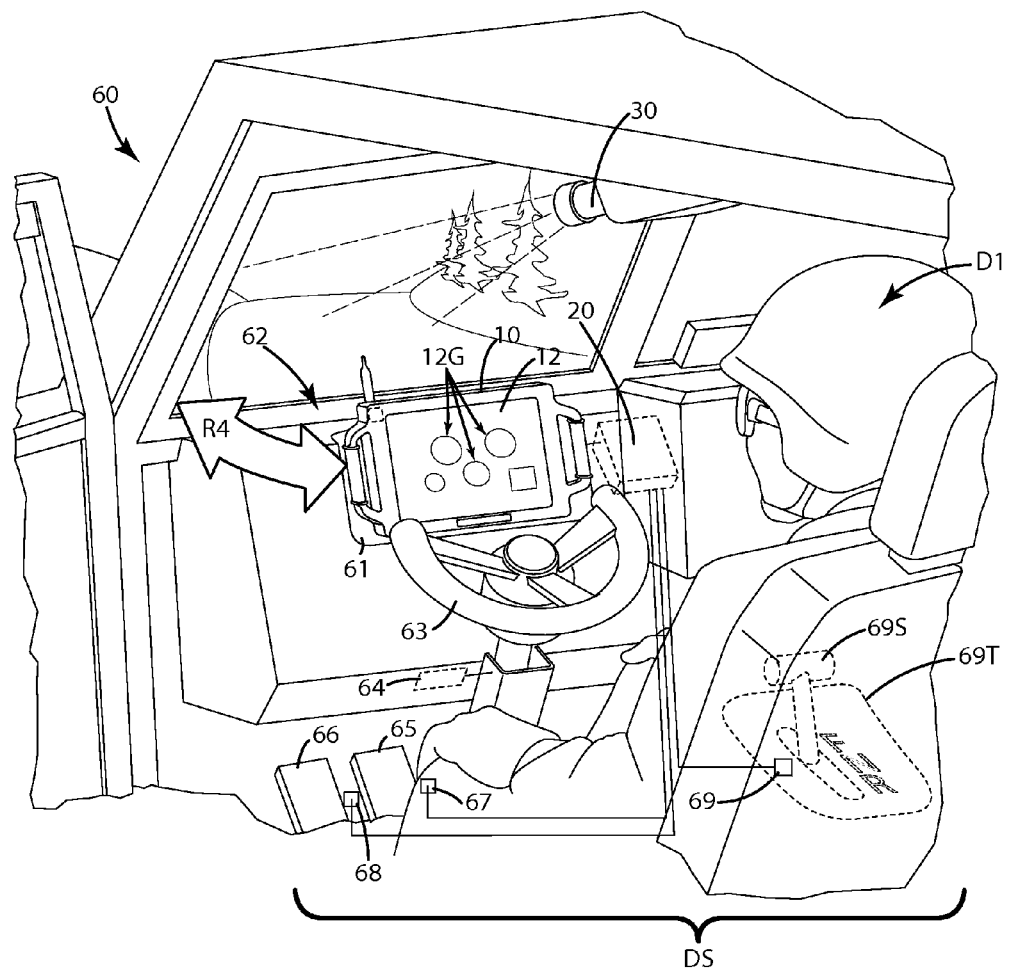
FIG. 2 is a perspective view of the system and instrument in a driver space of a vehicle.

As shown in FIG. 2, the instrument 10 can be installed in a driver's space DS of a vehicle as illustrated. Specifically, the instrument 10 can be removeably mounted in a docking station 61 associated with a dashboard 62 of the vehicle 60. The docking station 61 can include mechanical clamps, hinges, arms, actuators, or other latches, or magnets, to sufficiently lock and secure the instrument 10 in a fixed location on the dashboard 62. The docking station 61 and instrument 10 optionally can include respective plugs or connectors so that the instrument 10 can be in direct electrical connection with the vehicle control system 20 and/or a power supply. In some cases, the plugs or connectors can enable a power supply of a vehicle, such as a battery, to charge the instrument 10 and optionally recharge a portable self-contained battery 11B disposed in the housing 11 of the instrument 10 as shown in FIG. 1.

The vehicle 60 with which the instrument 10 is used can be any vehicle, wheeled or unwheeled. Generally, the vehicle can be configured to be manned and to have a driver or other occupants at certain times during its use. Alternatively, if desired, the vehicle could be an unmanned airborne drone. Optionally, the system and instrument herein can be implemented in military or law enforcement vehicles such as Humvees, tanks, armored personnel carriers or other land based vehicles. Alternatively, the instrument and system can be implemented in watercraft to assist in sea bound operations. Further, although described in connection with military and law enforcement vehicles, the system and instrument can be implemented in civilian vehicles, industrial vehicles, heavy trucks or recreational vehicles such as snowmobiles, motorcycles, side-by-side off road vehicles and/or four wheelers. Further, although shown in conjunction with a closed driver space vehicle, the instrument 10 of the system can be implemented in an open vehicle such as a motorcycle, snowmobile, utility vehicle or all-terrain vehicle.

The instrument 10 can be in constant communication with the vehicle control system 20. This can be accomplished via a direct electrical connection when the instrument 10 is docked in the docking station 61. Alternatively, when the instrument 10 is removed from the vehicle as shown via the arrows R4, the instrument 10 can send and receive signals via the transmitter/receiver 14 to and from the vehicle control system 20. Optionally, the signals can be encrypted.

As illustrated in FIGS. 1 and 2, the vehicle 60 can include an imaging system 30. This imaging system 30 can be in the form of a video camera or other imaging device. For example, the imaging device can be replaced with an infrared sensor, a thermal imaging unit, or other imaging devices capable of capturing images of a particular field of view of the vehicle 60. As illustrated, the imaging device 30 generally points in a direction forwardly of the vehicle 60 to attain a frontal perspective view of upcoming terrain. This view generally can be aligned with the view of the driver D1. The images captured by the imaging device 30 can be transmitted to the vehicle control system 20, which can further transmit those images to the instrument 10 so that the instrument 10 can display the point of view of the imaging device 30 on the display 12. Thus, the driver D1 or any other user holding the instrument 10 and viewing the display 12 can see what the vehicle imaging device 30 images.

Figure 3:
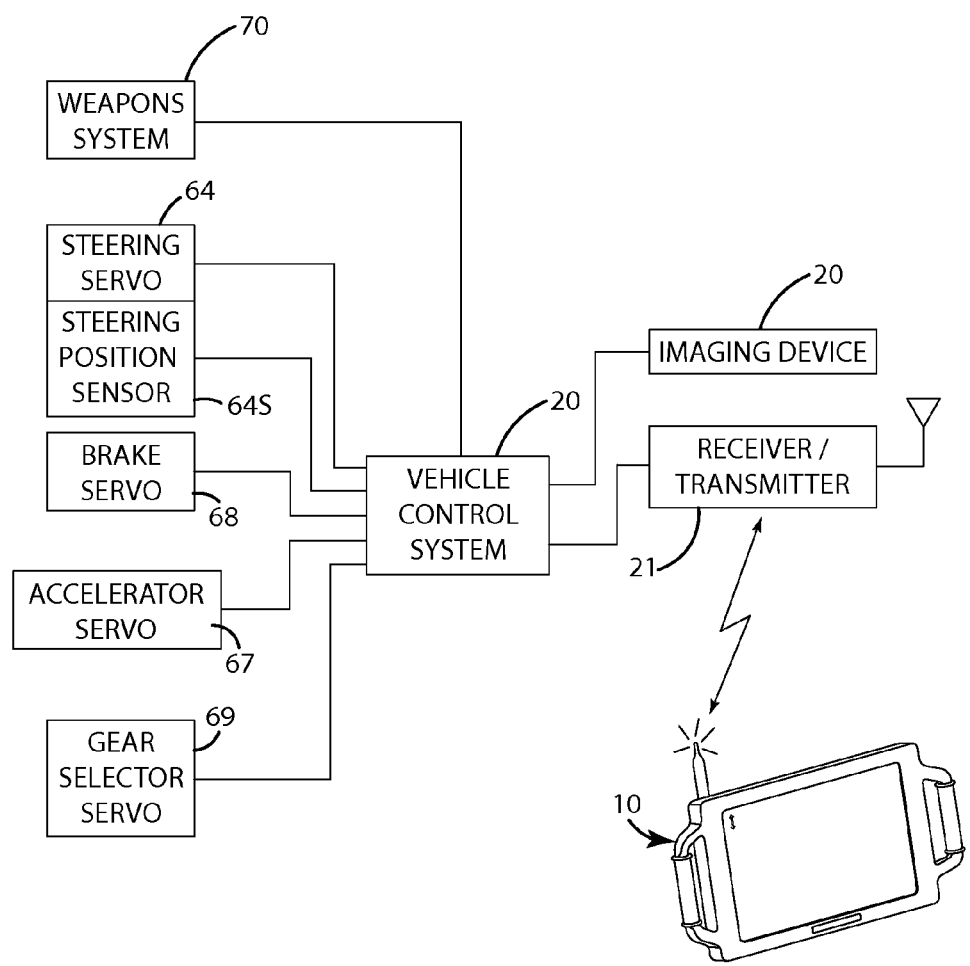
FIG. 3 is a schematic illustrating a vehicle control system operable by and/or in communication with the instrument.

FIG. 3 shows the vehicle control system 20 in more detail. Again the vehicle control system can be in the form of an engine control module, a vehicular computer, or any other processing device capable of operating various components of the vehicle. The vehicle control system 20 can be in communication, either directly or wirelessly, with multiple other components of the vehicle. For example, it can be in communication with the imaging device 30 so that images from the imaging device 30 can be transferred to the vehicle control system 20 and further transmitted to the instrument 10. The vehicle control system 20 also can be in communication with a receiver/transmitter 21 which transmits or receives signals or commands to and from the instrument 10.

The vehicle control system 20 can be in further communication with multiple other devices capable of operating different input instruments of the vehicle 60. For example, as shown in FIGS. 2 and 3, the vehicle 60 can include a steering wheel 63 to which a steering servo 64 is mechanically or otherwise joined. The servo 64 can be any electromechanical or other device capable of adjusting the steering of the vehicle remotely. Optionally, the servo 64 can be overridden by a driver's D1 manual operation of the steering wheel 63. The steering servo 64 can include or be coupled with a steering position sensor 64S which can generally sense the position of the steering wheel and provide feedback to the vehicle control system 20 and subsequently to the user via the instrument 10.

The vehicle control system 20 can transmit signals received from the instrument 10 to the steering servo 64 to operate the steering servo and thereby steer the vehicle to the left or to the right or any other direction as desired. This can be done while the steering position sensor 64S feeds back signals to the vehicle control system 20 and ultimately to the instrument 10.

The vehicle control system as shown in FIG. 3 can be in communication with a brake servo 67 and an accelerator servo 68. These servos, like the steering servo above, can be in the form of any electromechanical actuator or other device that can operate and/or otherwise cause the respective brakes and accelerators to operate, thereby causing the vehicle to brake and/or accelerate. Such electromechanical actuators, however, are integrated into the vehicle so they need not be removed when a user is in the driver space and controlling the vehicle. With the instrument 10, a user can send signals to the vehicle system control 20 to operate the respective brake and accelerator servos 67 and 68. As shown in FIG. 1, the display 12 displays "speed," "brake" and "arm" functions. By touching the display image "speed", a user can adjust the speed of the vehicle 60. Alternatively, the user also can brake by depressing the touch screen "brake" as shown.

As shown in FIG. 1, the display 12 can also include an "arm" button which can enable or otherwise operate a weapons or defense system 70 of the vehicle 60, if so equipped. The weapons system can be, for example, a machine gun, an artillery cannon, a missile system, a sonic blast device or any other type of weapon or defense system found on military and/or law enforcement vehicles. The weapons system 70 also can be in communication with the vehicle control system 20 and again can be controlled via the instrument 10.

The vehicle control system 20 also can be in communication with a gear selector servo 69. The gear selector servo 69 can operate a gear selector 69S or generally operate a transmission 69T of the vehicle 60. The gear selector servo can be any type of electromechanical or other actuator capable of manipulating the gear selector 69S or otherwise changing gears in the transmission 69T of the vehicle 60.

The instrument is operable in a direct vehicle operation mode and a remote control mode. As shown in FIG. 2, the instrument 10 is in a direct vehicle operation mode. In this mode the instrument 10 is docked in the docking station 61 in the dashboard 62. The display 12 in this configuration can display various operating parameters of the vehicle. For example, the display 12 can display digital gauges 12G which can simulate a tachometer, a speedometer, a gear selector, a fuel gauge, an electrical system output or an oil pressure gauge. The gauges 12C also can provide weapons or defense system status, braking, acceleration, fuel economy, odometer or other types of information. In the direct vehicle operation mode, the instrument 10 can assist the driver D1 in operating the vehicle and monitoring the status of the same. Of course, the display 12 could display images captured by the imaging device 30 and display them to user D1. This can be implemented where the windshield is heavily armored and difficult to see through.

In the direct vehicle operation mode, the instrument 10 is removably mounted relative to the docking station 61 and generally removably mounted to the dashboard 62. In this configuration, the instrument 10 can be in operative communication with the vehicle control system 20 to relay operating parameters, signals and commands of the vehicle between the instrument and control system.

Optionally, in the direct vehicle operation mode the instrument 10 can display the view as shown in FIG. 1. There, the display 12 shows the view of the terrain in front of the vehicle 60 via the imaging device 30. The display 12 also can provide functional controls for speed, braking and arming of the weapons system. Accordingly, instead of operating the braking and accelerator pedals 66 and 65, the driver D1 can operate the braking and acceleration of the vehicle using the instrument 10 while it is installed in the vehicle and while the driver D1 is in the driver space DS.

Figure 10:
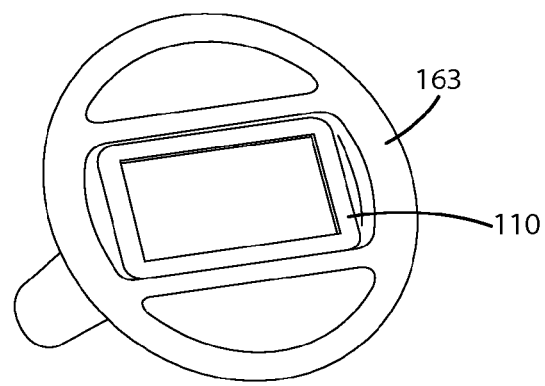
FIG. 10 is a perspective view of an alternative mounting configuration of the instrument relative to a steering wheel.
Figure 11:
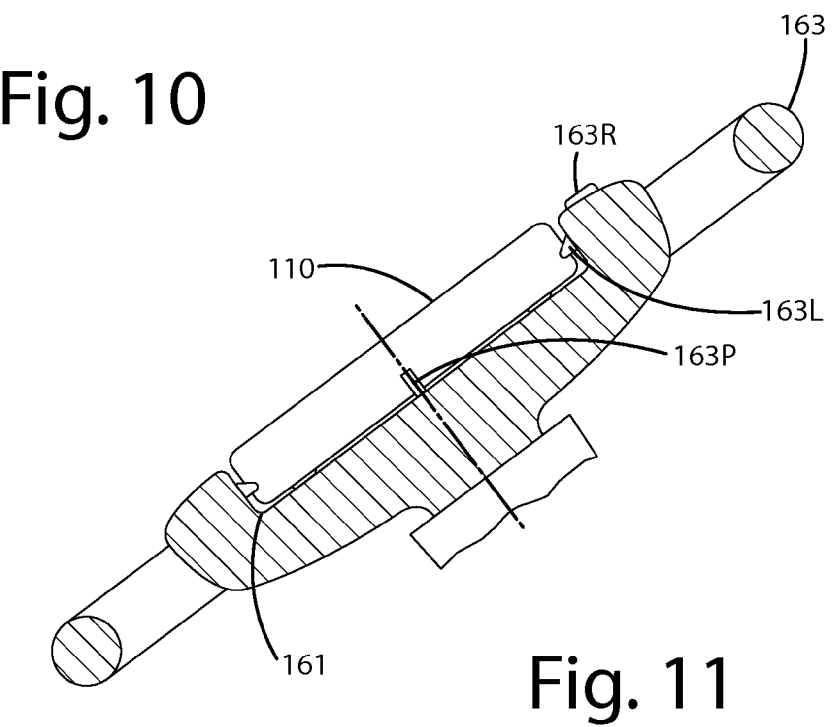
FIG. 11 is a section view of the instrument mounted in a docking station in a steering wheel of the vehicle.

In the direct vehicle operation mode, the instrument 10 can be mounted in the driver space DS on the dashboard 62. In alternative constructions, however, the instrument can be mounted in different locations in the vehicle. For example, as shown in the alternative embodiments of FIGS. 10 and 11, instead of on the dashboard, the instrument 110 can be mounted directly in the steering wheel 163. As shown in FIG. 11 the steering wheel 163 can define a docking station 161. A plug 163P can be disposed in the docking station to provide electrical communication between the instrument 110 and the vehicle control system. The docking station 161 can include mechanical latches 163L that engage the housing of the instrument 110 to hold the instrument 110 within the docking station. The latches 163 can be in communication with a release 163R which can release the latches 163 and allow the instrument 110 to be removed from the docking station 161 and from the vehicle.

Figure 4:
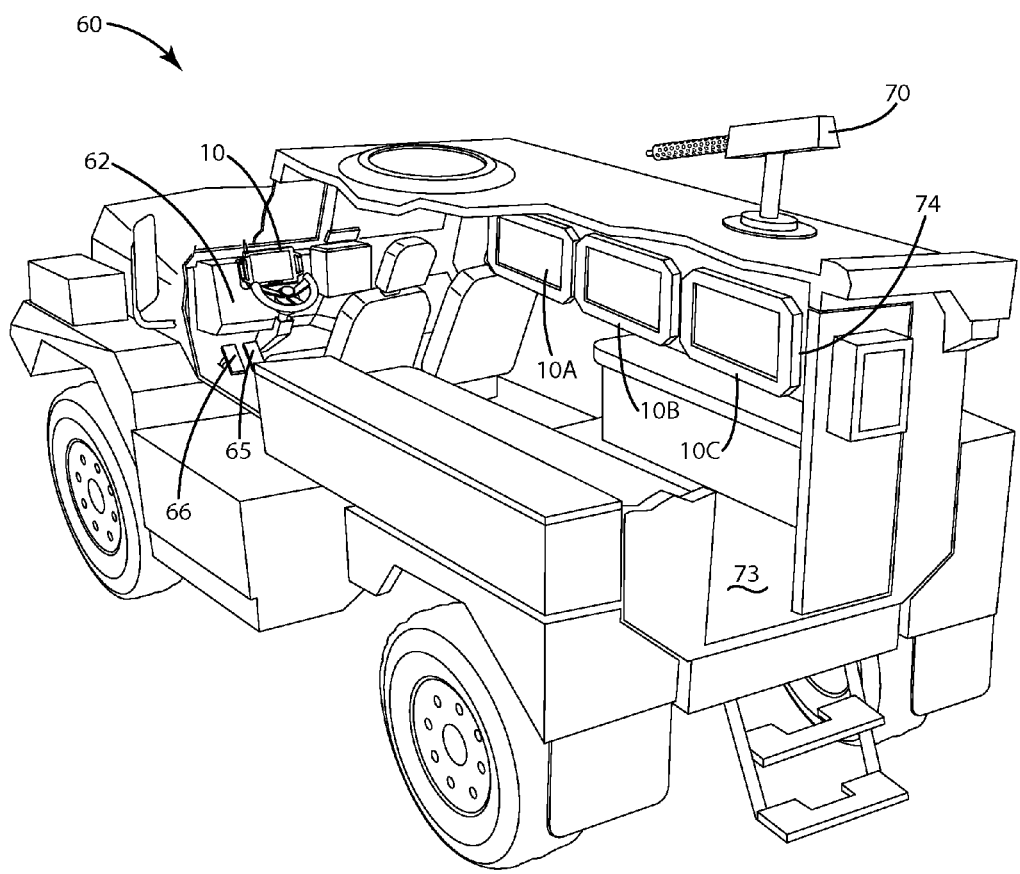
FIG. 4 is a perspective view of mounting locations for the instrument in a vehicle.
Figure 5:
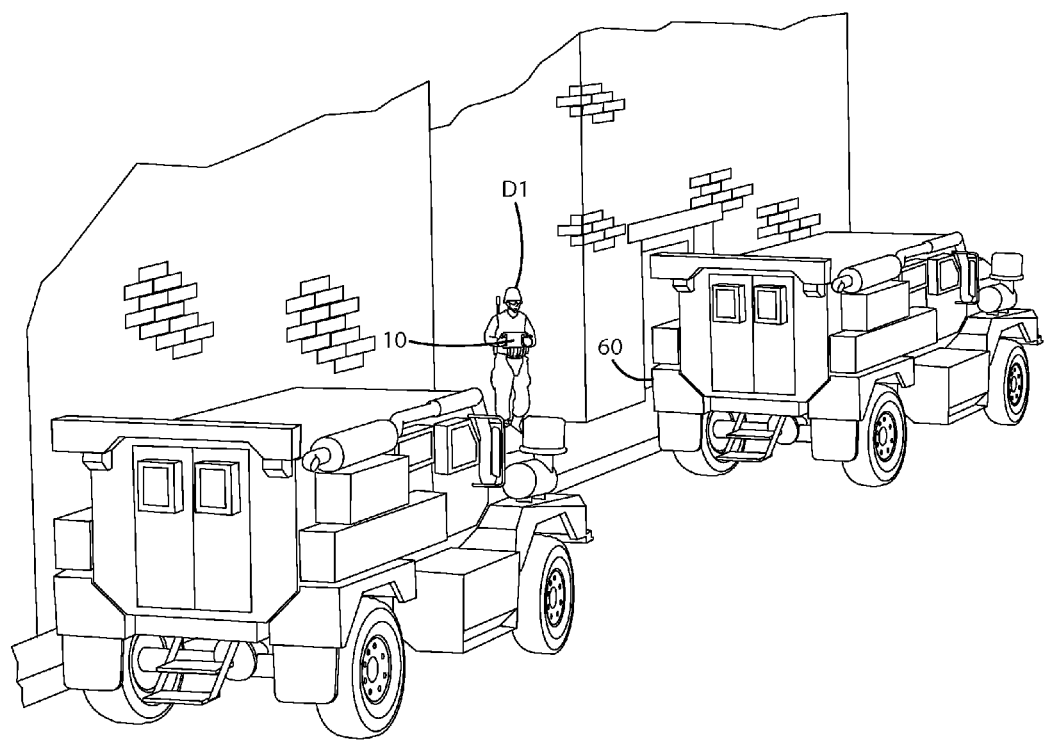
FIG. 5 is a perspective view of the instrument in a remote vehicle control mode.

FIG. 4 illustrates other alternative mounting locations for the instrument while located in a vehicle. As shown there, the vehicle 60 includes a personnel compartment 73 which can be located rearward of the driver space DS. The personnel compartment 73 can be configured to transport extra personnel in the vehicle 60. The personnel compartment 73 can include a mounting rack 74 upon which multiple secondary instruments 10A, 10B and 10C are mounted. These secondary instruments can be duplicates of the primary instrument 10 in the dash 62 of the vehicle 60. They also can be used to carry out the same functionality of the primary instrument 10 mounted in the dash 62. Thus, if a driver in the driver space DS becomes incapacitated, a second user in the personnel compartment 73 could actuate and use one of the secondary instruments 10A to remotely operate the vehicle from a location distal from the driver space DS. The secondary instrument 10A and any other secondary instruments can be prioritized so that a special procedure is followed before the secondary instrument can be used to overtake control of the vehicle 60. This procedure can be implemented via software or programming.

Returning to FIG. 2, the instrument 10 also is operable in a remote control mode. To attain this remote control mode the driver D1 or some other user must remove the instrument 10 from the docking station 61 and generally from the dashboard 62 and/or driver space DS in the direction of the arrow R4. In so removing the instrument, buttons or other actuators may be activated by the user or instrument to physically release and/or electrically decouple the instrument 10 from the dashboard 62 and the vehicle 60 in general.

Upon being separated from the docking station 61, the instrument 10 can undergo a protocol in which it actuates the sensors 15A and 15B to enable them to detect motion or movement of the instrument 10. Alternatively, a user can actuate a push button on the display to engage those sensors 15A and 15B or other functionality of the instrument when the user desires to remotely control various aspects of the vehicle.

Optionally, remote operation of one or more vehicles with the instrument can be performed at varying distances from a respective vehicle. As an example, the instrument can be at least 50, at least 100, at least 200, at least 400, at least 800 at least 1,000 yards, or farther away from the respective vehicle which it remotely controls.

Figure 6:
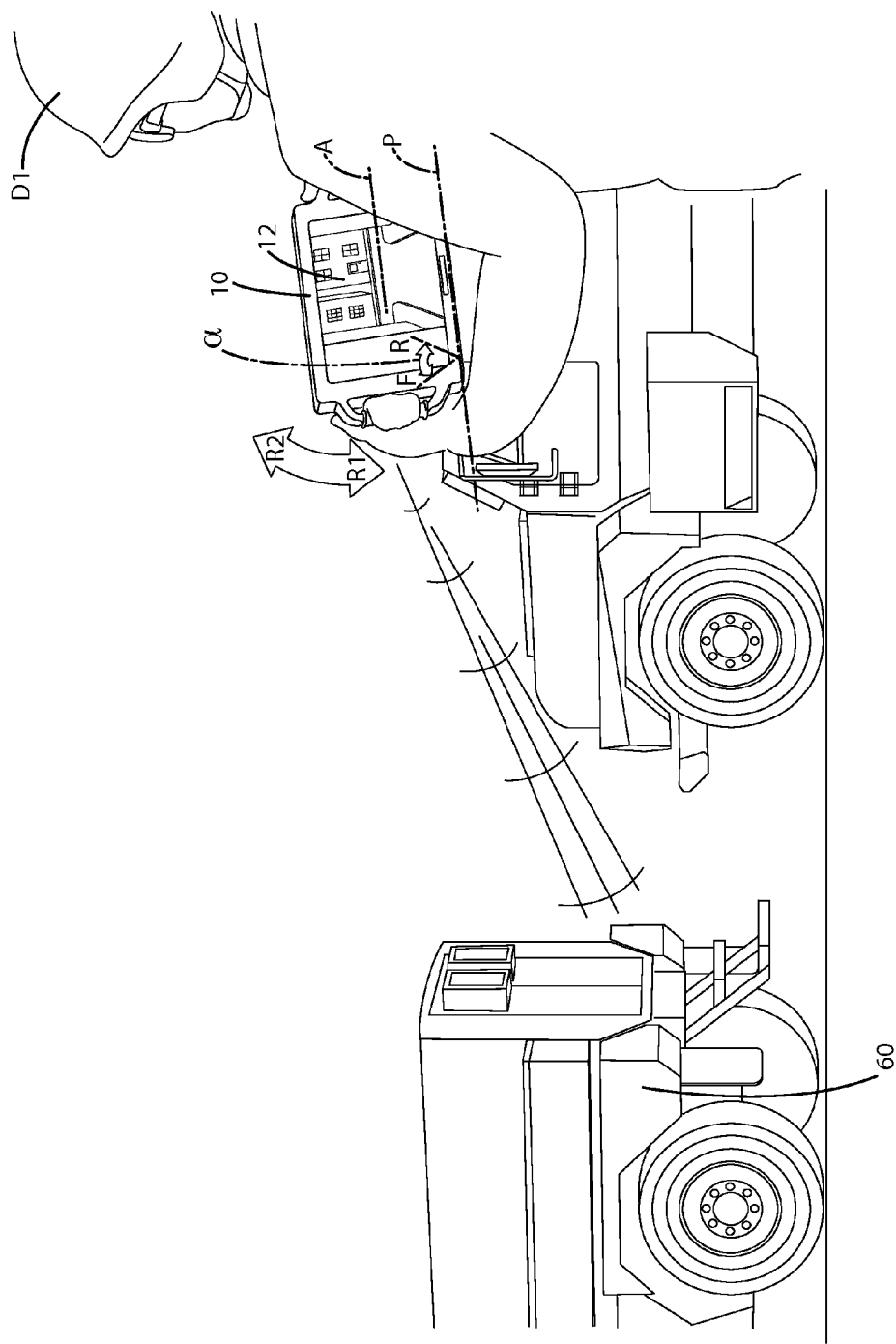
FIG. 6 is a perspective view of the instrument in a remote vehicle control mode, illustrating a point of view of the vehicle on a display of the instrument.
Figure 7:
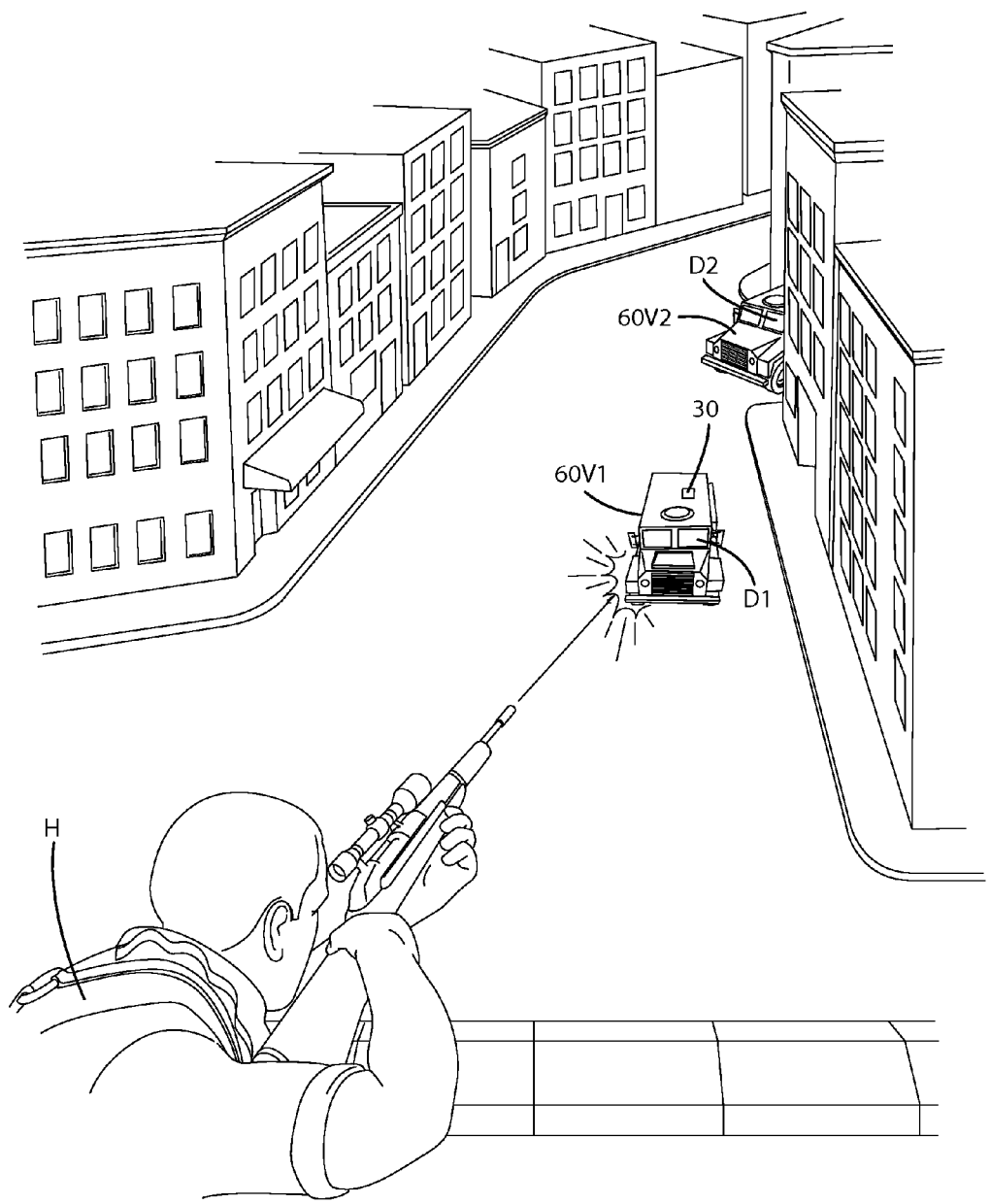
FIG. 7 is a perspective view of a hostile action taken on a first vehicle.

As shown in FIG. 6, the instrument 10 can be removed from the vehicle and used in a remote control mode by the user D1 to remotely operate the vehicle 60. The vehicle 60, via its imaging device 30, and vehicle control system 20, can transmit images to the display 12 of instrument 10. The user D1 can view the images collected by the imaging device and attain a frontal perspective view of the vehicle 60 as it moves. The user D1 also can remotely control various aspects of the vehicle, for example, speed, acceleration, braking, gear selection, steering of the vehicle and/or weapon or defense system actuation.

As a more particular example, the user can rotate the instrument 10 about an axis A, again which can be generally perpendicular to the display 12, in clockwise direction R2 or counterclockwise direction R1. This can simulate movement of a steering wheel when/if a user D1 is located in the driver space DS of the vehicle. These motions are detected by the sensors 15A and 15B of the instrument 10. Sensors 15A and 15B relay this information or signals associated with it to the vehicle control system 20. Before, during or after this transfer, the instrument 10 and/or system 20 can translate the signals into commands or other signals to operate certain controls of the vehicle. For example, the commands or other signals can actuate the steering servo 64 to turn the vehicle right or left, respectively.

Optionally, the sensors 15A and 15B can detect the relative movement of the instrument about one or more axes, for example, axis A or axis P, or any other axes. The instrument 10 and its processors can translate the relative movement of the instrument into signals. These signals can be transmitted to the vehicle control system 20. Alternatively, the vehicle control system 20 can perform the translation. The vehicle control system 20 can then directly control one of the respective servos, such as the steering servo 64, the accelerator servo 67, the braking servo 68 or the gear selector servo 69 to thereby operate the respective controls of the vehicle.

Further optionally, the user can cause the vehicle to go forward or rearward by tilting the instrument 10 in the directions F or R about a pivot axis P. During this movement, the sensors 15A and 15B, which can be in the form of inclinometers, can detect the movement about this pivot axis P and generally determine the angle α at which the instrument 10 is oriented, or the speed with which the instrument is tilted forward or rearward. Again, this relative movement or tilting of the instrument can be translated into signals to control the forward or rearward movement of the vehicle. As an example, the vehicle control system 20 can operate accelerator servo 67 and/or the breaking servo 68 through the vehicle control system 20. Alternatively, the instrument display 12 can display speed, braking, arming and/or other vehicle operations as illustrated in FIG. 1. The user can operate and manipulate these vehicle operation parameters by adjusting, moving and/or engaging the buttons respectively on the display 12.

Figure 9:
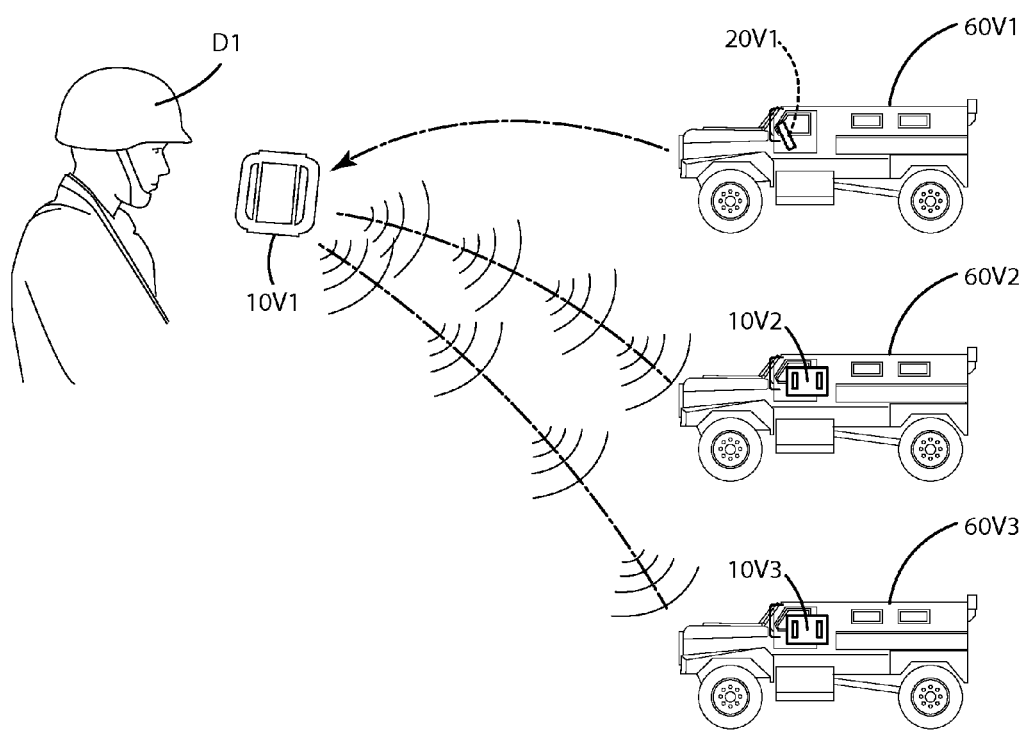
FIG. 9 is a schematic illustrating operation of multiple vehicles with an instrument.

As shown in FIG. 9, the system and instrument can be used to control one or more vehicles. In particular, the system can be used to perform a method of operating multiple vehicles. In this method, a first vehicle 60V1 can include a first instrument 10V1. A user can operate that first instrument 10V1 and, while in or remote from the first vehicle 60V1, and further use that instrument 10V1 to overtake operation of one or more vehicles 60V2 and 60V3.

As an example, the second vehicle 60V2 can include a second instrument 10V2 similar to the first instrument 10V1. A user D1 can operate the instrument 10V1 taken from the vehicle 60V1. The user can initiate this operation while in the vehicle 60V1 or remote from the vehicle 60V1. The user can actuate a selector switch so that the instrument 10V1 ceases operating the first vehicle 60V1, and is enabled to operate the second vehicle 60V2. Optionally, in such a selection, the instrument 10V1 can be blocked from sending signals or commands to the vehicle control system of the first vehicle 60V1. Alternatively, the vehicle control system 20V1 of the vehicle 60V1 can be put into a mode where it disregards any signals received from the instrument 10V1.

After instrument 10V1 is enabled to operate the second vehicle 60V2, the user D1 can then use the instrument 10V1 to send signals or commands to the other vehicle 60V2 and thereby control the various operations of those vehicles. As an example, the user D1 can remotely operate with the instrument 10V1 at least one of speed, acceleration, braking, gear selection, steering, weapon or defense operation of the second vehicle 60V2 with that first handheld instrument 10V1. This can be accomplished even while the vehicle 60V2 has its own second instrument 10V2 installed, mounted or docked in it. In such a circumstance, the instrument 10V1 can override any input from the second instrument 10V2 in the second vehicle 60V2. Alternatively, a user in the second vehicle 60V2 can disengage or power down the associated second instrument 10V2 and allow the first instrument 10V1 to be used to overtake operation of the vehicle 60V2. Optionally, in a similar manner as noted above, the user D1 can enable the instrument 10V1 to allow control of various operations of the third vehicle 60V3, or other vehicles depending on the application.

The above secondary prioritized operation of the second vehicle 60V2 using an instrument 10V1 from another vehicle 60V1 can be implemented in various situations. As an example, the first 60V1, second 60V2 and third 60V3 vehicles can be traveling in a convoy. The second vehicle 60V2 and third vehicle 60V3 can be attacked by hostile forces. The occupants can be injured. In this circumstance, the first vehicle 60V1 can provide aid to the occupants of the vehicle, particularly if a driver is injured or direct vehicle operation is impaired. Specifically, the operator of the vehicle 60V1 can use the first instrument 10V1 to take over control of the second vehicle 60V2 and transport its occupants to safety. Alternatively, the first instrument 10V1 can take over operation of the third vehicle 60V3 and drive that vehicle to the other vehicle 60V2, which may be immobilized, pick up the occupants of the second vehicle 60V2 and transport them to safety in the vehicle 60V3, all while the vehicle 60V3 is remotely operated by the user D1 using the instrument 10V1.

Figure 8:
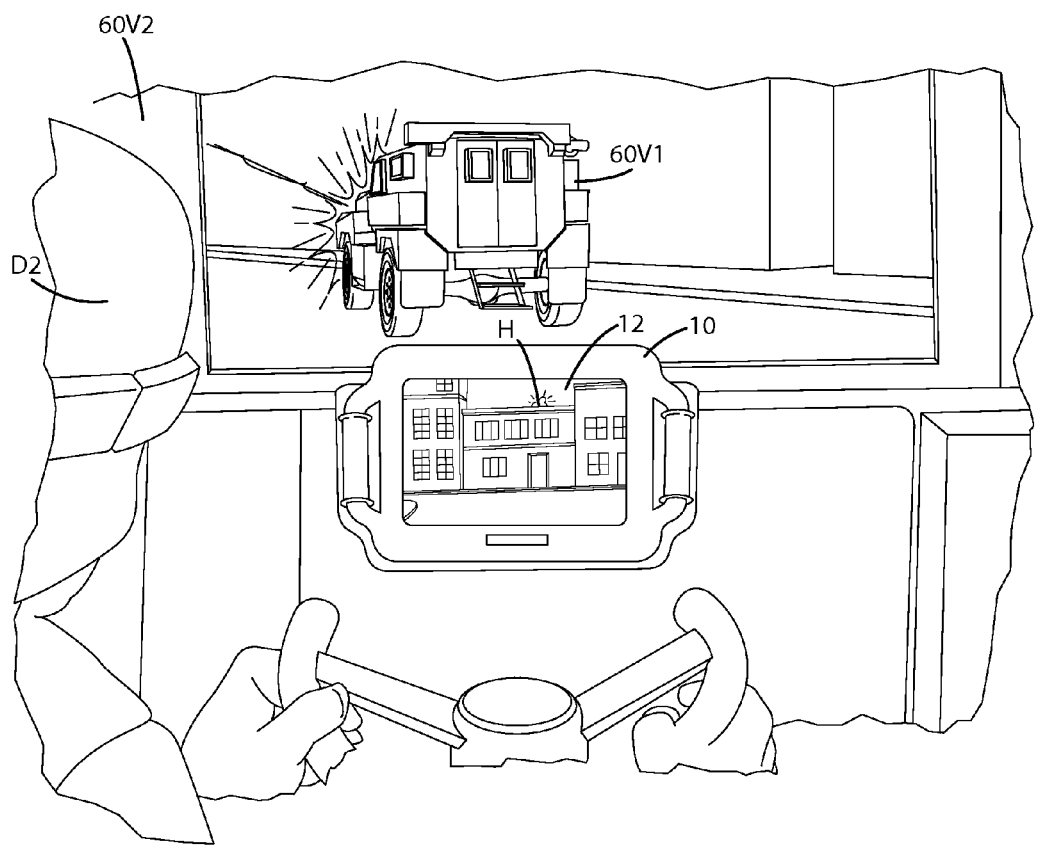
FIG. 8 is a perspective view of an occupant of a second, rearward vehicle viewing the hostile action on the first vehicle via an instrument in the second vehicle to gain situational awareness.

Optionally, the system and instrument of the current embodiments can be used to gain and/or relay situational information. As an example, with reference to FIGS. 7 and 8, vehicles 60V1 and 60V2 can be operated in a convoy. A first vehicle 60V1 can be attacked by hostile force H. The instrument in the second vehicle 60V2 can display images of the attack via the display 12 to a driver or occupant of the second vehicle 60V2. The images can be captured by the imaging device 30 on the first vehicle 60V1. Thus, the driver D2 of the second vehicle 60V2 can attain a same frontal field of view or perspective as the vehicle 60V1 through the imaging device 30, as shown in FIG. 8. In turn, the driver D2 can take evasive or other action with their vehicle 60V2 based on the information displayed through the display 12, and captured by the instrument of the first vehicle 60V1. This can enable operators to gain significant situational awareness, particularly of another vehicle remote from the instrument in their physical possession. Indeed, this can provide significant observational data. In some circumstances, images from multiple imaging devices on multiple vehicles can be collected and transmitted to multiple instruments. Users of those multiple instruments and drivers of respective vehicles can then gain even further situational awareness of their surroundings. This may be particularly useful in hostile or other environments.

The instruments herein also can be used to take over control of vehicles in other manners than those described above in the current embodiment. For example, an instrument 110 of another embodiment shown in FIG. 12 can enable a user D1 to select any given vehicle, for example 60V2, shown on the display of the instrument or otherwise in an image captured by an imaging device of a certain vehicle. After selection, the user can then fully or partially control operation of the vehicle, for example 60V2. The protocol for this "takeover mode" can be implemented as follows. The display 112 can be in the form of a touch screen adapted to receive input from a user by the user touching the screen or coming in close proximity to the screen with a stylus or other device. The user D1 can touch a vehicle 60V2 displayed on the display 112. This touch input can prompt the instrument to display a confirmation takeover icon 113 on the display to ensure the user D1 actually wants to take over the operation of the vehicle 60V2, as opposed to the displayed vehicle being touched inadvertently. If the user selects or touches the takeover icon, the takeover protocol can commence.

As part of this protocol, the instrument 110 can transmit a signal or command to the vehicle control system or instrument 10V2 of the second vehicle 60V2. Optionally, this signal or command may be displayed on a second instrument 10V2 in the second vehicle. The second instrument can display the impending takeover activity via a notification on its display. There can be an authorization feature to enable a driver or other person of the second vehicle 10V2 to authorize or not authorize the takeover. If the authorization feature is not responded to within a time period, then the takeover can commence. If it is responded to with an indication that the driver does not want the takeover, then the takeover will be abandoned and an alert to that effect will be displayed on the display 112 of the instrument 110.

Where the takeover is commenced or authorized, the vehicle control system of the second vehicle 60V2 can transmit or receive control signals or commands from the instrument 110, in which case the user D1 can assume control the vehicle 60V2 via the instrument 110. This type of takeover protocol generally enables an instrument user to touch a vehicle (with autonomous, remote control capability) shown on the display 112, and obtain remote control of that vehicle. With this functionality, the user operating the instrument 110 optionally can mobilize an unmanned asset, such as a vehicle 60V2, which may contain ammunition or needed cover. The mobilized asset can be remotely maneuvered to assist others in a battlefield. This can be helpful where the vehicle 60V2 is unmanned, or the occupants incapacitated, and the vehicle 60V2 is difficult to physically enter due to hostile activity.

Figure 12:
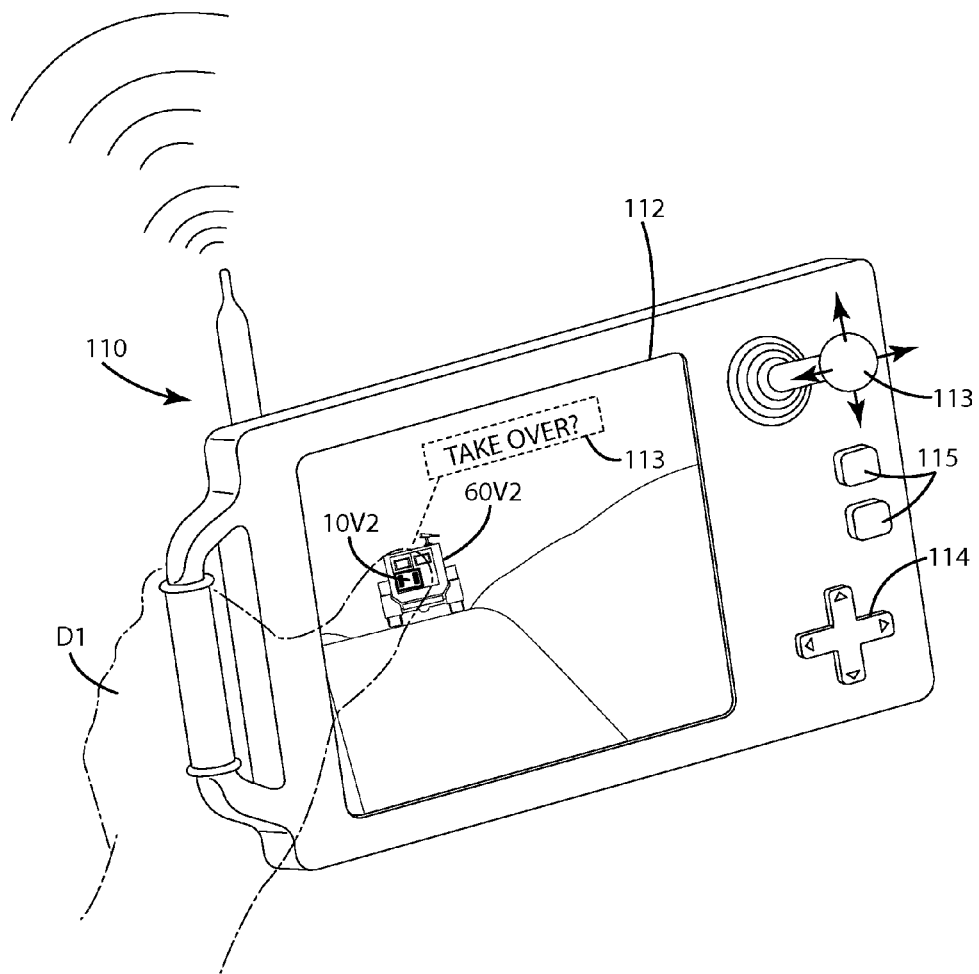
FIG. 12 is a perspective view of an alternative instrument and mode of operation.

The instrument 110 shown in FIG. 12 also illustrates different types of control inputs, in particular, a joystick 113 and a directional pad (D-pad) 114. Other control inputs can be in the form of manually operable buttons 115 that operate some parameter of a vehicle. These control inputs can be used instead of or in combination with the movement sensors 15A and 15B described in connection with the instrument current embodiment above. With these alternative control inputs, a user can remotely control operation of a vehicle. Generally, the operation and function of these alternative control inputs for remote control can be identical to that described in connection with the instrument current embodiment, with the exception that instead of sensing overall movement of the instrument, the user D1 can directly control the vehicle by manipulating one or more of the joystick, d-pad and buttons.

Generally, the instruments described herein can be designed, configured and/or programmed to support open software architecture. With this architecture, an application from any vehicle component designed for that open architecture can perform its task. The instrument can interface with that architecture and through the vehicle control system, can operate and command or otherwise control or provide inputs to selected applications of vehicle components.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A system for selective direct or remote operation of a vehicle, the system comprising:
   a vehicle control system associated with a vehicle;
   a handheld, selectively portable instrument comprising a communication element in communication with the vehicle control system, the instrument including a sensor that detects relative movement of the instrument by a user, and a display;
   a vehicle dashboard including a docking station; and
   an imaging device mounted on the vehicle, the imaging device in communication with the display of the handheld instrument,
   wherein the handheld instrument is operable in a direct vehicle operation mode, a remote control mode, and a takeover mode,
   wherein in the direct vehicle operation mode, the handheld instrument is removably mounted to the docking station and in communication with the vehicle control system;
   wherein in the remote control mode, the handheld instrument is removed and distal from the docking station, and manually moveable about at least one axis, with the sensor detecting the relative movement of the instrument by the user about the at least one axis, and the instrument translating the relative movement into signals to control at least one of speed, acceleration, braking, gear selection, weapon activation and steering of the vehicle,
   wherein at least one image captured by the imaging device is displayed on the display of the handheld instrument in the remote control mode, wherein in the takeover mode, the at least one image displayed on the display of the handheld instrument includes a takeover asset shown in the at least one image, wherein in the takeover mode, the handheld instrument is configured to allow a user to view and select the takeover asset shown in the at least one image, and thereby takeover, with the handheld instrument, the operation of the takeover asset.

2. The system of claim 1 wherein in the remote control mode, the sensor is operable to detect rotation of the handheld instrument and translate that rotation into steering the vehicle left or steering the vehicle right while the user is remote from the vehicle.

3. The system of claim 2,
wherein in the handheld instrument is configured to operate in the remote control mode to operate the takeover asset after the takeover mode is completed.

4. The system of claim 1 wherein the vehicle is a first vehicle,
wherein the takeover asset is a second vehicle,
wherein after the takeover mode, the handheld instrument is configured to control at least one of speed, acceleration, braking, gear selection, weapon activation and steering of the second vehicle, but does not control at least one of speed, acceleration, braking, gear selection, weapon activation and steering of the first vehicle.

5. The system of claim 1,
wherein the display is a touch screen, wherein in the takeover mode, the touch screen is configured to receive input from the user via the user at least one of touching the touch screen and coming in close proximity to the touchscreen with at least one of a digit and stylus,
wherein upon receiving the input from the user, the handheld instrument in the takeover mode displays a takeover icon on the display so that the user can confirm that takeover of the takeover asset is to commence.

6. The system of claim 5 wherein the display displays at least one of speedometer, tachometer, fuel level, electrical status, weapon status and oil pressure information while the handheld instrument is in the direct vehicle operation mode.

7. The system of claim 1 wherein the vehicle control system operates at least one servo that is operably coupled to at least one of brakes, a steering wheel, an accelerator, a gear selector and a weapon of the vehicle,
wherein the servo is mounted in the vehicle, and remains mounted, even when the user is in a driver space of the vehicle.

8. The system of claim 7 wherein the signals from the handheld instrument are sent to the vehicle control system which operates the servo in response thereto to control the vehicle when the handheld instrument is in the remote control mode.

9. The system of claim 1 wherein the handheld instrument is adapted to remotely operate the vehicle at a distance of at least 100 yards in the remote vehicle control mode.

10. The system of claim 9 wherein the vehicle is a wheeled or tracked military or law enforcement vehicle.

11. The system of claim 9 wherein the vehicle is a watercraft.

12. The system of claim 1 wherein the handheld instrument wirelessly communicates with the vehicle control system.

13. An instrument adapted for selective direct or remote operation of a vehicle, the instrument comprising:

a handheld, selectively portable instrument comprising a communication element adapted to communicate with a vehicle control system of a first vehicle, the instrument including at least one control input moveable by a user and a display, the instrument adapted for communication with an imaging device mounted on the first vehicle, wherein the handheld instrument is operable in a direct vehicle operation mode, a first remote control mode, a takeover mode, and a second remote control mode, wherein in the direct vehicle operation mode, the handheld instrument is removably mounted relative to a docking station in the first vehicle and in operative communication with the vehicle control system, the handheld instrument displaying via the display at least one of speedometer, tachometer, fuel level, electrical status, weapon status and oil pressure information while the handheld instrument is in the direct vehicle operation mode, wherein in the first remote control mode, the handheld instrument is removed and distal from the docking station and the first vehicle, and the control input is manually operable by the user, wherein the operation of the control input is translated into at least one of signals and commands to control at least one of speed, acceleration, braking, gear selection, weapon activation and steering of the first vehicle, wherein at least one image captured by the imaging device is displayed on the display of the handheld instrument, wherein in the takeover mode, the handheld instrument displays a second vehicle in the at least one image and the handheld instrument is configured to receive input from the user so that the handheld instrument can takeover operation of the second vehicle, wherein in the second remote control mode, the control input is manually operable by the user and the operation of the control input is translated into at least one of signals and commands to control at least one of speed, acceleration, braking, gear selection, weapon activation and steering of the second vehicle.

14. A method for operating a vehicle comprising:
providing a first vehicle, the first vehicle comprising a first handheld, selectively portable instrument, the first instrument including a first sensor that detects relative movement of the first instrument by a user and a first display, the first handheld instrument docked in a first docking station of the first vehicle, the first handheld instrument including a first display;

providing a second vehicle, the second vehicle comprising a second handheld, selectively portable instrument, the second instrument including a second sensor that detects relative movement of the second instrument by a user and a second display, the second handheld instrument docked in a second docking station of the second vehicle, the second handheld instrument including a second display; and removing the first handheld instrument from the first docking station of the first vehicle, the first handheld instrument displaying an image of the second vehicle on the first display;

providing input to the first handheld instrument to select the image of the second vehicle for operation of the second vehicle;

commencing takeover of a vehicle control system of the second vehicle with the first handheld instrument;

remotely operating at least one of speed, acceleration, braking, gear selection, steering and weapon operation of the second vehicle with the first handheld instrument after the vehicle control system of the second vehicle is taken over by the first instrument.

15. The method of claim 14 wherein the second vehicle includes an imaging device mounted on the second vehicle, the imaging device in communication with the first display of the first handheld instrument, comprising displaying a field of view to the user associated with the second vehicle while remotely controlling the second vehicle.

16. The method of claim 14 wherein the first display is a touchscreen, wherein the providing input step includes a user touching the touch screen with at least one of a digit and a stylus at a location where the second vehicle is displayed in the image.

17. The method of claim 14 comprising displaying a confirmation takeover icon on the first display before the commencing takeover step so that the user can confirm an intentional takeover of the second vehicle.

18. The method of claim 14 comprising transmitting with the first instrument at least one of a command and a signal to the second instrument for display in the form of notification on the second display of the second instrument.

19. The method of claim 18 comprising initializing an authorization protocol so that an occupant of the second vehicle, via the second instrument, can authorize or not authorize takeover of the second vehicle with the first instrument.

20. The method of claim 19 wherein the commencing takeover step occurs if the occupant of the second vehicle does not respond via the second instrument within a predetermined time period.

* * * * *